United States Patent
Lan

(10) Patent No.: US 12,078,742 B2
(45) Date of Patent: Sep. 3, 2024

(54) ENHANCING LOCATION ACCURACY IN DENSE URBAN ENVIRONMENT

(71) Applicant: T-MOBILE USA, INC., Bellevue, WA (US)

(72) Inventor: Wei-Ming Lan, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 18/104,983

(22) Filed: Feb. 2, 2023

(65) Prior Publication Data

US 2023/0176173 A1 Jun. 8, 2023

Related U.S. Application Data

(63) Continuation of application No. 17/015,661, filed on Sep. 9, 2020, now Pat. No. 11,598,837.

(51) Int. Cl.
| | |
|---|---|
| *G01S 19/48* | (2010.01) |
| *G01S 5/02* | (2010.01) |
| *G01S 5/10* | (2006.01) |
| *G01S 19/39* | (2010.01) |
| *H04W 4/02* | (2018.01) |
| *H04W 4/029* | (2018.01) |
| *H04W 4/90* | (2018.01) |

(52) U.S. Cl.
CPC .............. *G01S 5/0258* (2020.05); *G01S 5/10* (2013.01); *G01S 19/396* (2019.08); *G01S 19/48* (2013.01); *H04W 4/023* (2013.01); *H04W 4/029* (2018.02); *H04W 4/90* (2018.02); *G01S 2205/06* (2020.05)

(58) Field of Classification Search
CPC ...... G01S 19/396; G01S 19/48; H04W 4/029; H04W 4/90; H04W 4/023
USPC ..................................................... 342/357.31
See application file for complete search history.

(56) References Cited

U.S. PATENT DOCUMENTS

| | | | |
|---|---|---|---|
| 8,135,413 | B2 | 3/2012 | Dupray |
| 9,113,343 | B2 | 8/2015 | Moshfeghi |
| 9,282,433 | B2 | 3/2016 | Gupta et al. |
| 9,674,684 | B1 | 6/2017 | Mendelson |
| 9,942,719 | B2 | 4/2018 | Bitra et al. |
| 10,641,861 | B2 | 5/2020 | Dupray et al. |
| 10,684,350 | B2 | 6/2020 | Dupray et al. |
| 11,425,529 | B2 | 8/2022 | Mehta et al. |
| 2010/0048163 | A1 | 2/2010 | Parr et al. |
| 2013/0324154 | A1 | 12/2013 | Raghupathy et al. |

(Continued)

FOREIGN PATENT DOCUMENTS

CA 2779926 A1 * 7/2011 .............. H04M 1/66

*Primary Examiner* — Harry K Liu
(74) *Attorney, Agent, or Firm* — Lee & Hayes, P.C.

(57) ABSTRACT

Systems and methods for determining a location of a mobile computing device requesting emergency services are provided. A mobile computing device may receive an indication of a request for emergency services from a user of the mobile computing device. The mobile computing device may receive a first wireless signal from a first device. The wireless signal may include an indication of a first geographic position associated with the first device. The mobile computing device may determine a location associated with the mobile computing device based on the indication of the first geographic position associated with the first device, and may send the determined location to a provider of emergency services.

18 Claims, 4 Drawing Sheets

(56) References Cited

U.S. PATENT DOCUMENTS

2015/0018011 A1\* 1/2015 Mendelson ........... G01S 5/0226
                                                    455/456.3
2015/0289088 A1  10/2015 Terrazas
2017/0238129 A1   8/2017 Maier et al.
2017/0238136 A1   8/2017 Smith \* cited by examiner

ENHANCING LOCATION ACCURACY IN DENSE URBAN ENVIRONMENT

CROSS-REFERENCE TO RELATED APPLICATIONS

The present application is a continuation of U.S. patent application Ser. No. 17/015,661, filed Sep. 9, 2020, and entitled "Enhancing Location Accuracy in Dense Urban Environment," the entire disclosure of which is incorporated by reference herein.

FIELD OF THE DISCLOSURE

The present disclosure generally relates to determining the location of a mobile computing device and, more particularly, determining the location of a mobile computing device requesting emergency services in situations or locations in which Global Positioning System (GPS) location data is inaccurate, unreliable, or otherwise unavailable in a structure-dense environment.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Enhanced 911 ("E911") is a system used to automatically provide a caller's location to 911 emergency service dispatchers. Generally speaking, an incoming 911 call is routed to a Public Safety Answering Point (PSAP), which is a call center operated by the local government. At the PSAP, the call is answered by a 911 dispatcher, who receives information from the network service provider associated with the caller about the physical address (for landline calls) or geographic coordinates (for wireless calls) of the caller. This information is used to dispatch police, fire, medical, and other services as needed.

Specifically, when a wireless network user places an E911 call using a mobile computing device, a wireless network service provider must determine the location of the user's mobile computing device at the time of the call so that emergency services may be dispatched to that location. Typically, a mobile computing device will determine its location using a GPS signal, and this GPS-based location is transmitted to the wireless network service provider for use in E911 dispatching. However, in dense urban areas ("urban canyons"), GPS signals can be blocked by tall buildings, leading to less accurate location determination in these areas. Consequently, if a GPS location is used for dispatching emergency services within a dense urban area, emergency service providers may be dispatched to an incorrect location, leading to potentially life-threatening delays in emergency services.

SUMMARY

Systems and methods for determining the location of a mobile computing device (e.g., a smartphone) requesting emergency services are provided herein. In an example, smart internet-of-things (IoT) devices positioned within an urban area may be utilized to determine a more accurate location of a user's mobile computing device after the user places an E911 call. Specifically, IoT devices may be installed at various types of fixed-location (or otherwise known-location) urban infrastructure, such as traffic light poles, street light poles, street sign poles, public trashcans, billboards or other advertising installments, public transit busses or trains, etc., and may be configured to broadcast short-range signals (e.g., via Wi-Fi, Bluetooth, 5G millimeter wave, 5G sub-6GHz, or other short-range wireless technologies) indicating their respective locations, and a user's mobile computing device may determine its location based at least in part on receiving these short-range signals.

For instance, an IoT device installed at a street light pole at the intersection of First Street and Main Street may broadcast these cross-streets, or may broadcast GPS coordinates associated with these cross-streets, or some other indication of the location of the light pole. When a user's mobile computing device receives this broadcasted indication of the location of the light pole via the short-range signal broadcasted by the IoT device installed at the light pole, the user's mobile computing device may determine that it is within a certain threshold distance of the indicated location of the light pole (e.g., based on a known range of the signal, and/or based on the strength of the received signal). In some examples, the user's mobile computing device may determine its location based on a triangulation of multiple signals (and associated signal strengths) from multiple IoT devices, and/or some combination of a (possibly inaccurate) GPS location and one or more signals from IoT devices.

Advantageously, by using location data broadcast by IoT devices installed at fixed urban locations, a mobile computing device in a dense urban area may determine its location with improved accuracy compared to determining its location using a GPS signal alone. This more accurate location may be utilized to provide more accurate directions to emergency services providers dispatched in response to an E911 call placed by the mobile computing device.

In one aspect, a computer-implemented method is provided, comprising: receiving, by a mobile computing device, an indication of a request for emergency services from a user of the mobile computing device; receiving, by the mobile computing device, a first wireless signal from a first device, the wireless signal including an indication of a first geographic position associated with the first device; determining, by the mobile computing device, a location associated with the mobile computing device based on the indication of the first geographic position associated with the first device; and sending, by the mobile computing device, the determined location to a provider of emergency services.

In another aspect, a computer-implemented method is provided, comprising: receiving, from a mobile computing device, an indication of a request for emergency services; receiving, from the mobile computing device, an indication of a first wireless signal received by the mobile computing device from a first device, the wireless signal including an indication of a first geographic position associated with the first device; determining a location associated with the mobile computing device based on the indication of the first geographic position associated with the first device; and sending the determined location to a provider of emergency services.

In still another aspect, a system is provided, including: a first device associated with a first geographic position and configured to send a signal including an indication of the first geographic position; a mobile computing device configured to receive the signal including the indication of the first geographic position from the first device; one or more processors; and a non-transitory program memory communicatively coupled to the one or more processors and storing executable instructions that, when executed by the one or more processors, cause the processors to: receive an indication of a request for emergency services associated with the mobile computing device; determine a location associated with the mobile computing device based on the indication of the first geographic position associated with the first device; and send the determined location to a provider of emergency services.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Figure 1:
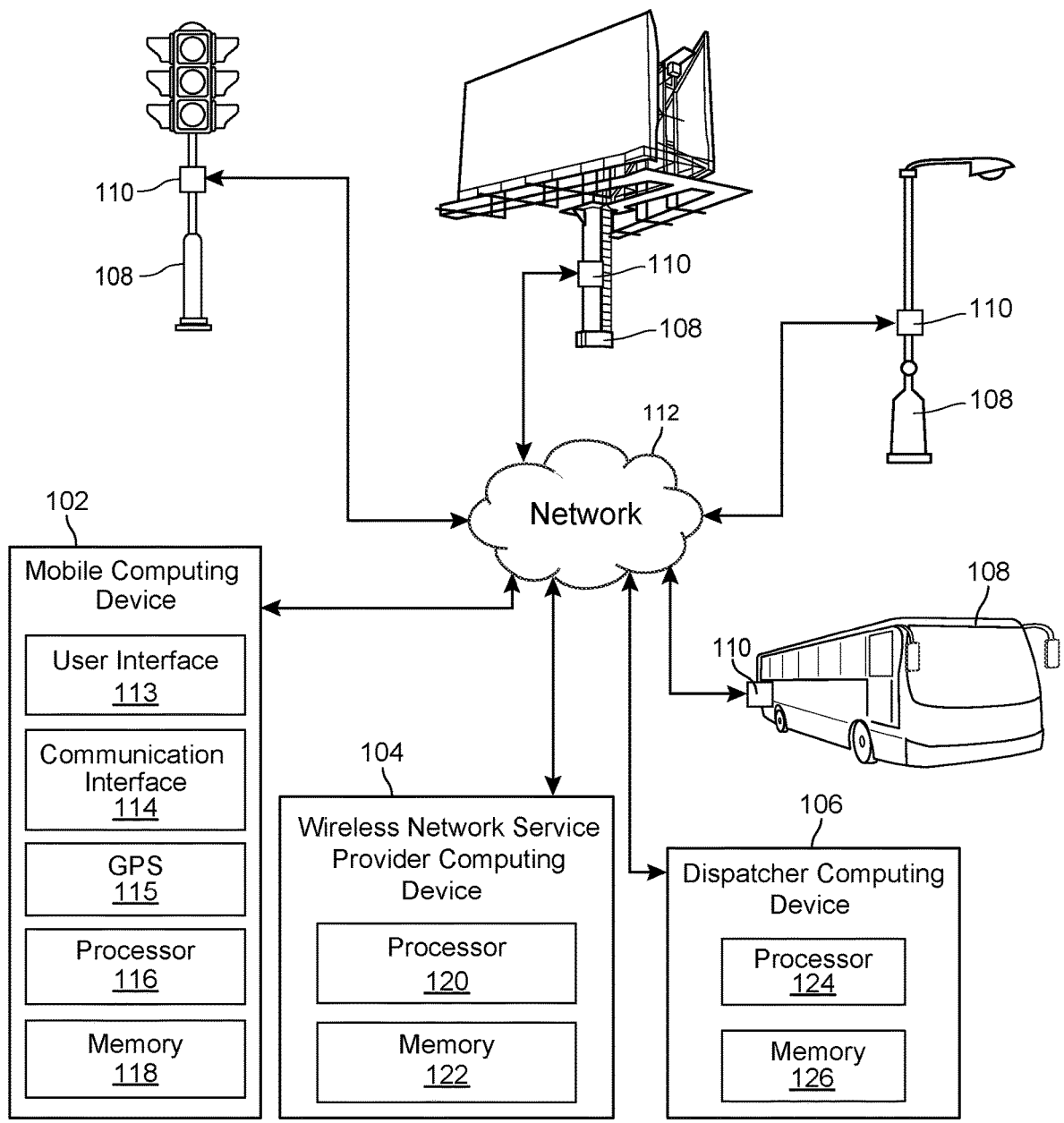
FIG. 1 illustrates a block diagram of an exemplary system for determining a location of a mobile computing device requesting emergency services, in accordance with some embodiments.

Referring now to the drawings, FIG. 1 illustrates a block diagram of an exemplary system 100 for determining a location of a mobile computing device requesting emergency services, in accordance with some embodiments. The high-level architecture illustrated in FIG. 1 may include both hardware and software applications, as well as various data communications channels for communicating data between the various hardware and software components, as is described below.

The system 100 may include a mobile computing device 102, a wireless network service provider computing device 104, a dispatcher computing device 106, one or more infrastructure components 108 (such as, e.g., traffic light poles, street light poles, street sign poles, public trashcans, billboards or other advertising installments, public transit busses or trains, etc.), and one or more devices 110 (e.g., "beacons") attached to or incorporated within the infrastructure components 108. Each device 110 may include a transmitter configured to broadcast a short-range signal (e.g., via Wi-Fi, Bluetooth, 5G millimeter wave, etc.) that includes a unique ID indicating the geographic position of the device 110 (e.g., cross-streets, geographic coordinates, or another suitable indication of the geographic position of the device 110 and/or the infrastructure component 108 associated with the device 110) and, in some examples, a known range of the signal. In some examples, transmitters of the devices 110 may be low-power transmitters configured to intentionally decrease the range of the signal to a known range (e.g., a five-foot range, a ten-foot range, a fifteen-foot range, etc.).

Various of the mobile computing device 102, a wireless network service provider computing device 104, a dispatcher computing device 106, and/or devices 110 may be configured to communicate with one another via one or more wireless networks 112, which may include cellular networks, Wi-Fi networks, and/or other internet or telecommunication networks.

The mobile computing device 102 may include a user interface 113 configured to receive input from users of the mobile computing device 102, e.g., including requests for emergency services, as well as a communication interface 114 configured to receive signals sent by the devices 110, and a GPS receiver 115 configured to receive GPS signals. Moreover, the mobile computing device 102 may include one or more processors 116, such as one or more microprocessors, controllers, and/or any other suitable type of processor. The mobile computing device 102 may further include a memory 118 (e.g., volatile memory, non-volatile memory) accessible by the one or more processors 116 (e.g., via a memory controller). The one or more processors 116 may interact with the memory 118 to obtain, for example, computer-readable instructions stored in the memory 118. The instructions may include instructions for, e.g., receiving a request for emergency services from a user, determining the location of the mobile computing device 102 based on signals received from one or more of the devices 110 and/or GPS signals received by the GPS receiver 115, and sending the determined location to a dispatcher computing device 106, or sending indications of the request for emergency services and the signals received from one or more of the devices 110 and/or GPS signals received by the GPS receiver 115 to the wireless network service provider computing device 104 (which may in turn determine the location of the mobile computing device 102 and send the determined location to the dispatcher computing device 106). In particular, the computer-readable instructions stored on the memory 118 may include instructions for carrying out any of the steps of the method 300 described in greater detail below with respect to FIG. 3.

Similarly, the wireless network service provider computing device 104 may include one or more processors 120, such as one or more microprocessors, controllers, and/or any other suitable type of processor. The wireless network service provider computing device 104 may further include a memory 122 (e.g., volatile memory, non-volatile memory) accessible by the one or more processors 120 (e.g., via a memory controller). The one or more processors 120 may interact with the memory 122 to obtain, for example, computer-readable instructions stored in the memory 122. For instance, the instructions may include instructions for receiving an indication of a request for emergency services from the mobile computing device 102, receiving indications of wireless signals from devices 110 received by the mobile computing device 102 (from the mobile computing device 102), receiving indications of GPS signals received by the mobile computing device 102 (from the mobile computing device 102), determining the location of the mobile computing device 102 based on geographic positions indicated in the short range signals from the devices 110 received by the mobile computing device 102, and sending the determined location associated with the mobile computing device 102 to the dispatcher computing device 106. In particular, the computer-readable instructions stored on the memory 122 may include instructions for carrying out any of the steps of the method 400 described in greater detail below with respect to FIG. 4.

Finally, the dispatcher computing device 106 may include one or more processors 124, such as one or more microprocessors, controllers, and/or any other suitable type of processor. The dispatcher computing device 106 may further include a memory 126 (e.g., volatile memory, non-volatile memory) accessible by the one or more processors 124 (e.g., via a memory controller). The one or more processors 124 may interact with the memory 126 to obtain, for example, computer-readable instructions stored in the memory 124. For instance, the instructions may include instructions for receiving an indication of a location of a mobile computing device 102, either from the mobile computing device 102 itself or from a wireless network service provider computing device 104 operated by a wireless network service provider associated with the mobile computing device 102, and instructions for providing the location of the mobile computing device 102 to appropriate emergency services (e.g., police department, fire department, ambulance, etc.).

Figure 2:
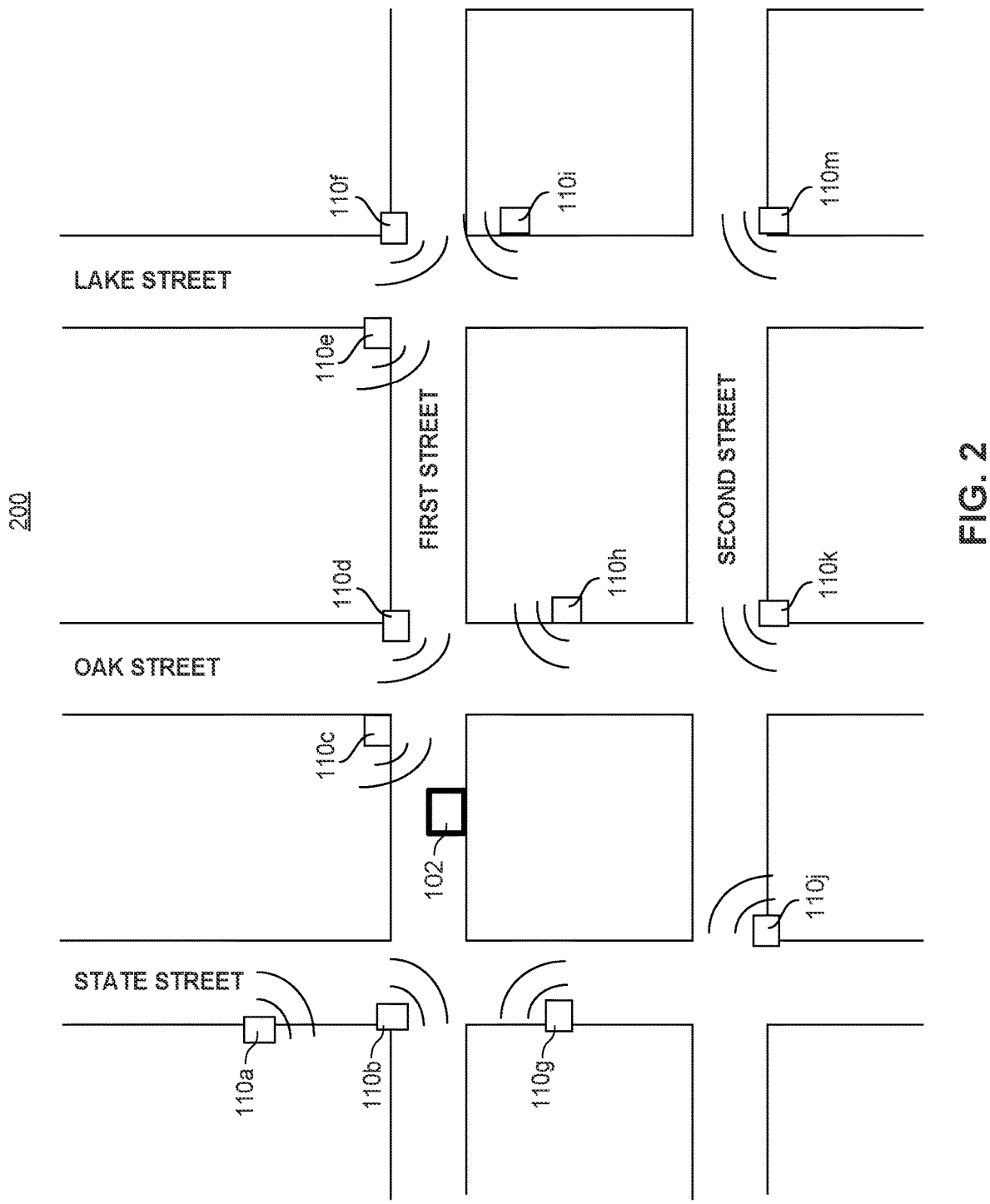
FIG. 2 illustrates a map view of an exemplary urban environment, including indications of geographic locations of various devices within the urban environment, in accordance with some embodiments.

FIG. 2 illustrates a map view of an exemplary urban environment 200, including indications of geographic locations of various devices within the urban environment, in accordance with some embodiments. As shown in FIG. 2, the exemplary urban environment 200 includes East-West streets First Street and Second Street and North-South streets Lake Street, Oak Street, and State Street. A mobile computing device 102 positioned on First Street between State Street and Oak Street may receive short-range signals indicative of geographic position from one or more of the various devices 110*a*-110*m* attached to, or otherwise incorporated within, various urban infrastructure components 108 located throughout the urban environment 200. Factors such as the specific devices (of the devices 110*a*-110*m*) from which the mobile computing device 102 receives signals, the strength of each signal, and/or the range of each signal may be utilized in determining the location of the mobile computing device 102, either by the mobile computing device 102 itself or by the wireless network service provider computing device 104.

For instance, if the mobile computing device 102 receives only a signal from device 110*c* located at the crossing of First Street and Oak Street, the location of the mobile computing device 102 may be determined to be at the crossing of First Street and Oak Street. If the signal range associated with the device 110*c* has a known value, the location of the mobile computing device 102 may be determined to be within the known range of the crossing of First Street and Oak Street. For instance, if the device 110*c* has a known signal range of ten feet, the mobile computing device 102 receiving a signal from the device 110*c* is an indication that the mobile computing device 102 is within ten feet of the geographic location of the device 110*c* (e.g., the crossing of First Street and Oak Street). Moreover, if the mobile computing device 102 receives a signal from device 110*c* located at the crossing of First Street and Oak Street as well as a signal from device 110*b* located at the crossing of First Street and State Street, the location of the mobile computing device 102 may be determined to be somewhere between the crossing of First Street and Oak Street and the crossing of First Street and State Street. Furthermore, if the mobile computing device 102 receives a stronger signal from device 110*c* located at the crossing of First Street and Oak Street as well as a weaker signal from device 110*b* located at the crossing of First Street and State Street, the location of the mobile computing device 102 may be determined to be between the crossing of First and Oak Streets and the crossing of First and State street, but slightly closer to the crossing of First and Oak Streets. Similar analyses may be performed using signals received by the mobile computing device 102 from any number of devices 110*a*-*m*, the strengths of these signals, and/or the ranges of these signals. Accordingly, with a large number of devices 110*a*-*m* located throughout an urban environment 200, the location of a mobile computing device 102 in the urban environment 200 may be determined with a high degree of accuracy based on which signals the mobile computing device 102 receives, the strength of each signal, and/or the range of each signal.

Figure 3:
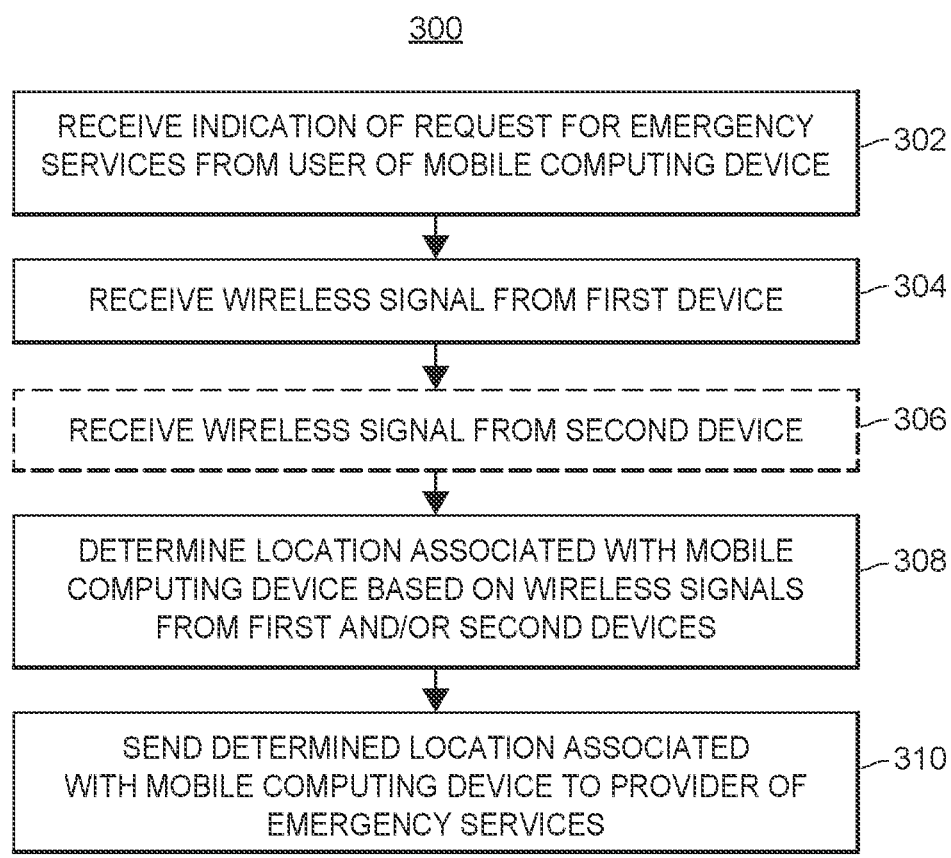
FIG. 3 illustrates a flow diagram of an exemplary method for determining the location of a mobile computing device requesting emergency services by the mobile computing device, in accordance with some embodiments.

FIG. 3 illustrates a flow diagram of an exemplary method 300 for determining the location of a mobile computing device requesting emergency services by the mobile computing device, in accordance with some embodiments. One or more steps of the method 300 may be implemented as a set of instructions stored on a computer-readable memory 118 and executable on one or more processors 116 of a mobile computing device 102 in communication with one or more devices 110 attached to or incorporated within infrastructure components 108.

At block 302, an indication of a request for emergency services from a user of the mobile computing device may be received (e.g., by the mobile computing device). For instance, the request for emergency services may be a 911 call (i.e., an E911 call) by a user of the mobile computing device.

In some examples, the mobile computing device may attempt to determine its location based on GPS signals after receiving the request for emergency services. If the mobile computing device fails to receive a GPS signal at all, or fails to receive a strong GPS signal, or otherwise fails to determine its location within a certain accuracy threshold, the mobile computing device may search for wireless signals from nearby devices, i.e., in order to obtain a more accurate location associated with the mobile computing device.

Moreover, in some examples, the mobile computing device may determine an approximate location for itself based on any GPS signals received (even if the GPS signal is weak or inaccurate), and may search for wireless signals from nearby devices based on the approximate location indicating a city having certain characteristics. For instance, if the approximate location indicates that the mobile computing device is likely located within a very large (e.g., greater than a threshold size) and/or very populous (e.g., greater than a threshold population) city, and/or otherwise within a city that has very tall buildings (e.g., taller than a threshold height), and/or a very large number of buildings (e.g., greater than a threshold number of buildings or greater than a threshold density of buildings), the mobile computing device may search for wireless signals from nearby devices because GPS signals received within the city may be inaccurate or unreliable. For example, if the approximate location based on the GPS signal indicates that the mobile computing device is likely located within New York City, and one or more of the size, population, number of buildings, and/or height of buildings associated with New York City are greater than a threshold value, the mobile computing device may search for wireless signals from nearby devices i.e., in order to obtain a more accurate location associated with the mobile computing device, because GPS signals within New York City may be inaccurate or unreliable due to tall buildings blocking the signals.

In other examples, the mobile computing device may search for wireless signals from nearby devices regardless of whether the mobile computing device receives a GPS signal, and regardless of the mobile computing device's approximate city location.

In any case, at block 304, a first wireless signal may be received from a first device (e.g., by the mobile computing device). For instance, the first device may broadcast a short-range signal (e.g., via Wi-Fi, Bluetooth, 5G millimeter wave, etc.) including an indication of a first geographic position associated with the first device. In some examples, the short-range signal may also include an indication of the approximate range of the signal (e.g., the signal may indicate that it has a typical range of five feet). In some examples, the first device may be attached to or incorporated within a traffic light, a street light, a street sign, a trash bin, a billboard, a building, a public transit vehicle, or other urban infrastructure, and the indication of the first geographic position associated with the first device may be an indication of the location of the urban infrastructure that the first device is attached to or incorporated within. For instance, if the first device is attached to or incorporated within a traffic light, the indication of the first geographic position may include cross-streets associated with the traffic light, geographic coordinates associated with the traffic light, or any other indication of the location of the traffic light.

At block 306, optionally, a second wireless signal may be received from a second device (e.g., by the mobile computing device). For instance, the second device may broadcast a short-range signal (e.g., via Wi-Fi, Bluetooth, 5G millimeter wave, etc.) including an indication of a second geographic position associated with the second device. As with the first device, in some examples, the second device may be attached to or incorporated within a traffic light, a street light, a street sign, a trash bin, a billboard, a building, a public transit vehicle, or other urban infrastructure, and the indication of the second geographic position associated with the second device may be an indication of the location of the urban infrastructure that the second device is attached to or incorporated within. For instance, if the second device is attached to or incorporated within a trash bin, the indication of the first geographic position may include cross-streets associated with the trash bin, geographic coordinates associated with the trash bin, or any other indication of the location of the trash bin.

Moreover, in some examples, any number of wireless signals may be received by the mobile computing device from any number of devices in various geographic positions near the mobile computing device in a similar manner as described above with respect to the first and second device (e.g., the mobile computing device may receive a third wireless signal from a third device indicating a third geographic position associated with the third device, a fourth wireless signal from a fourth device indicating a fourth geographic position associated with the fourth device, etc.).

At block 308, a location associated with the mobile computing device may be determined (e.g., by the mobile computing device) based on the indication of the first geographic position associated with the first device and/or the indication of the second geographic position associated with the second device. For instance, the fact that the mobile computing device receives a short range wireless signal from the first device and/or the second device may indicate that the mobile computing device is near the first device and/or the second device, so the broadcasted geographic position of the first or second device may be used as a proxy for the geographic position of the mobile computing device. Moreover, when the mobile computing device receives multiple wireless signals from multiple nearby devices, the geographic positions associated with each device may be triangulated to determine the location of the mobile computing device.

In some examples, determining the location associated with the mobile computing device may be based on the first signal strength associated with the first wireless signal and/or the second signal strength associated with the second wireless signal. For instance, if the mobile computing device receives wireless signals from more than one device, the device that is closest to the mobile computing device may be associated with the strongest wireless signal received by the mobile computing device. Moreover, as discussed above, when the mobile computing device receives multiple wireless signals from multiple nearby devices, the geographic positions associated with each device may be triangulated to determine the location of the mobile computing device. The strength of each signal may be used in the triangulation process to determine the location of the mobile computing device.

Moreover, in some examples, the first wireless signal and/or the second wireless signal may have known ranges, and determining the location associated with the mobile computing device may be based on the range of the first wireless signal and/or the range of the second wireless signal. For instance, if the first wireless signal transmitted by the first device has a known range of five feet, the location of a mobile computing device receiving the first wireless signal must be within five feet of the geographic position of the first device. Similarly, if the first wireless signal transmitted by the first device has a known range of five feet and the second wireless signal transmitted by the second device has a known range of ten feet, the location of the mobile computing device receiving both the first wireless signal and the second wireless signal must be within five feet of the geographic position of the first device and within ten feet of the geographic position of the second device, and the location of the mobile computing device may be determined (or may be narrowed to a small range of possible locations) based on these constraints.

Furthermore, in some examples, determining the location associated with the mobile computing device may include verifying the location determined based on the first and/or second wireless signals using on a GPS location determined based on a GPS signal received by the mobile computing device, or vice versa. For instance, the GPS signal received by the mobile computing device (however weak or inaccurate) may be used to confirm basic details (e.g., an area of the city) of the geographic position that is broadcasted by a device via a short-range wireless signal, e.g., to ensure that there is no error with the broadcast.

At block 310, the determined location may be sent (e.g., by the mobile computing device) to a dispatcher or other provider of emergency services (e.g., police, ambulance, fire department, etc.), or to a wireless service provider which then sends the determined location on to the dispatcher or provider of emergency services. The dispatcher may join the location data to a particular E911 call and send an appropriate emergency response to the location (e.g., based on both the determined location and any information provided by the caller about the nature of the emergency).

Figure 4:
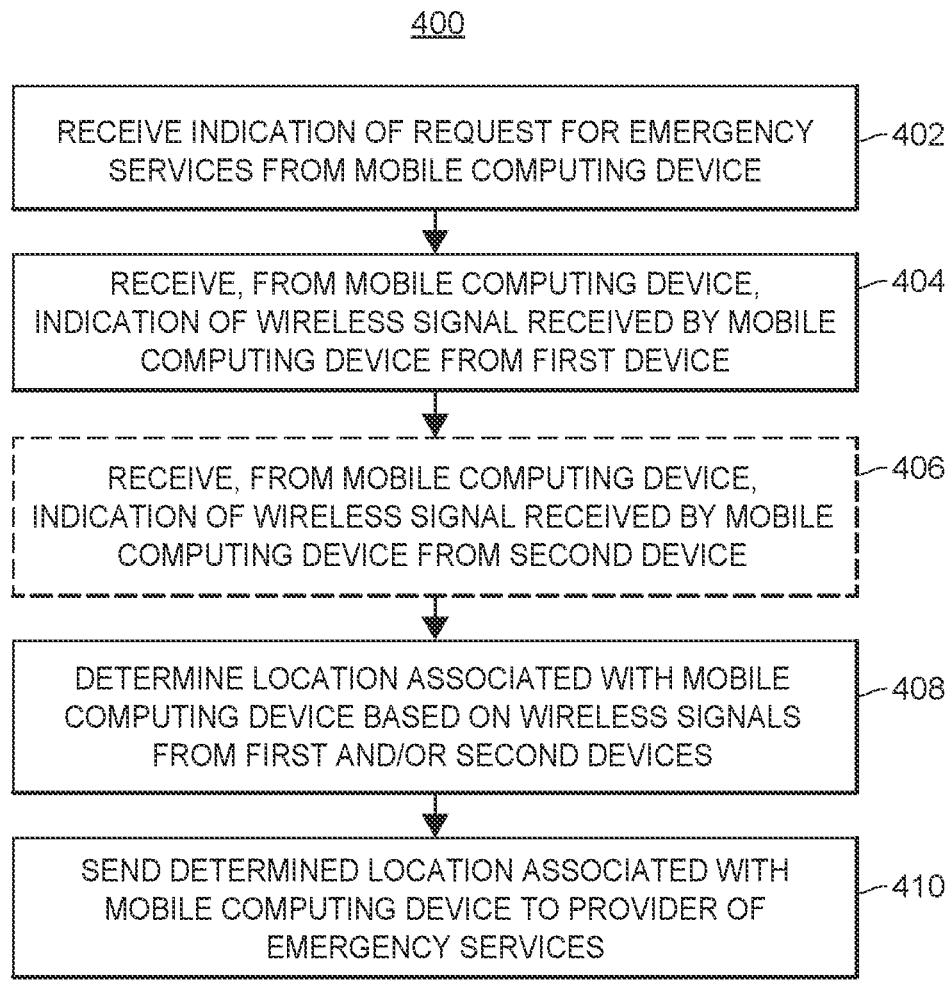
FIG. 4 illustrates a flow diagram of an exemplary method for determining a location of a mobile computing device requesting emergency services by another computing device, in accordance with some embodiments.

FIG. 4 illustrates a flow diagram of an exemplary method 400 for determining a location of a mobile computing device requesting emergency services by another computing device (e.g., a wireless network service provider computing device), in accordance with some embodiments. One or more steps of the method 400 may be implemented as a set of instructions stored on a computer-readable memory 122 and executable on one or more processors 122 of a wireless network service provider computing device 104 in communication with a mobile computing device 102.

At block 402, an indication of a request for emergency services may be received from a mobile computing device. For instance, the request for emergency services may be a 911 call (i.e., an E911 call) by a user of the mobile computing device. In some examples, the method 400 may include sending a request to the mobile computing device for indications of any GPS signals and/or wireless signals received by the mobile computing device, e.g., responsive to receiving the request for emergency services from the mobile computing device.

Additionally, in some examples, the method 400 may include attempting to determine the location of the mobile computing device based on indications of GPS signals received by the mobile computing device. In some examples, if the mobile computing device fails to receive a GPS signal, fails to receive a strong GPS signal or fails to send an indication of the GPS signal received, the method 400 may include sending a request to the mobile computing device to search for wireless signals from nearby devices and send indications of any signals received, i.e., in order to obtain a more accurate location associated with the mobile computing device.

Moreover, in some examples, the method 400 may include determining an approximate location for the mobile computing device based on any indications of GPS signals received (even if the GPS signal is weak or inaccurate), and may include sending a request to the mobile computing device to search for wireless signals from nearby devices and send indications of any signals received based on the approximate location indicating a city having certain characteristics. For instance, if the approximate location indicates that the mobile computing device is likely located within a very large (e.g., greater than a threshold size) and/or very populous (e.g., greater than a threshold population) city, and/or otherwise within a city that has very tall buildings (e.g., taller than a threshold height), and/or a very large number of buildings (e.g., greater than a threshold number of buildings or greater than a threshold density of buildings), the method 400 may include sending a request to the mobile computing device to search for wireless signals from nearby devices and send indications of any signals received, because GPS signals received by the mobile computing device within the city may be inaccurate or unreliable. For example, if the approximate location based on the GPS signal indicates that the mobile computing device is likely located within New York City, and one or more of the size, population, number of buildings, and/or height of buildings associated with New York City are greater than a threshold value, the method 400 may include sending a request to the mobile computing device to search for wireless signals from nearby devices and send indications of any signals received, i.e., in order to obtain a more accurate location associated with the mobile computing device, because GPS signals within New York City may be inaccurate or unreliable due to tall buildings blocking the signals. In other examples, the mobile computing device may search for wireless signals from nearby devices and send indications of signals received regardless of any GPS signals received or any requests.

In any case, at block 404, an indication of a first wireless signal received by the mobile computing device from a first device may be received. That is, the mobile computing device may transmit an indication of the first wireless signal it receives from the first device, and the signal transmitted by the mobile computing device may be received at block 404. The first wireless signal may include an indication of a first geographic position associated with the first device. For instance, the first device may broadcast a short-range signal (e.g., via Wi-Fi, Bluetooth, 5G millimeter wave, etc.) including an indication of a first geographic position associated with the first device. In some examples, the first device may be attached to or incorporated within a traffic light, a street light, a street sign, a trash bin, a billboard, a building, a public transit vehicle, or other urban infrastructure, and the indication of the first geographic position associated with the first device may be an indication of the location of the urban infrastructure that the first device is attached to or incorporated within. For instance, if the first device is attached to or incorporated within a traffic light, the indication of the first geographic position may include cross-streets associated with the traffic light, geographic coordinates associated with the traffic light, or any other indication of the location of the traffic light.

At block 406, optionally, an indication of a second wireless signal received by the mobile computing device from a second device may be received (e.g., from the mobile computing device). That is, the mobile computing device may transmit an indication of the second wireless signal it receives from the second device, and the signal transmitted by the mobile computing device may be received at block 406. The second wireless signal may include an indication of a second geographic position associated with the second device. For instance, the second device may broadcast a short-range signal (e.g., via Wi-Fi, Bluetooth, 5G millimeter wave, etc.) including an indication of a second geographic position associated with the second device. As with the first device, in some examples, the second device may be attached to or incorporated within a traffic light, a street light, a street sign, a trash bin, a billboard, a building, a public transit vehicle, or other urban infrastructure, and the indication of the second geographic position associated with the second device may be an indication of the location of the urban infrastructure that the second device is attached to or incorporated within. For instance, if the second device is attached to or incorporated within a trash bin, the indication of the first geographic position may include cross-streets associated with the trash bin, GPS coordinates associated with the trash bin, or any other indication of the location of the trash bin. In some embodiments, further indications of additional wireless signals received by the mobile computing device from additional devices may likewise be received and used in determining a location of the mobile computing device.

At block 408, a location associated with the mobile computing device may be determined based on the indication of the first geographic position associated with the first device and/or the indication of the second geographic position associated with the second device. For instance, the fact that the mobile computing device receives a short range wireless signal from the first device and/or the second device may indicate that the mobile computing device is near the first device and/or the second device, so the broadcasted geographic position of the first or second device may be used as a proxy for the geographic position of the mobile computing device. Moreover, when the mobile computing device receives multiple wireless signals from multiple nearby devices, the geographic positions associated with each device may be triangulated to determine the location of the mobile computing device.

In some examples, determining the location associated with the mobile computing device may be based on the first signal strength associated with the first wireless signal and/or the second signal strength associated with the second wireless signal. For instance, if the mobile computing device receives wireless signals from more than one device, the device that is closest to the mobile computing device may be associated with the strongest wireless signal received by the mobile computing device. Moreover, as discussed above, when the mobile computing device receives multiple wireless signals from multiple nearby devices, the geographic positions associated with each device may be triangulated to determine the location of the mobile computing device. The strength of each signal may be used in the triangulation process to determine the location of the mobile computing device.

Moreover, in some examples, the first wireless signal and/or the second wireless signal may have known ranges, and determining the location associated with the mobile computing device may be based on the range of the first wireless signal and/or the range of the second wireless signal. For instance, if the first wireless signal transmitted by the first device has a known range of five feet, the location of a mobile computing device receiving the first wireless signal must be within five feet of the geographic position of the first device. Similarly, if the first wireless signal transmitted by the first device has a known range of five feet and the second wireless signal transmitted by the second device has a known range of ten feet, the location of the mobile computing device receiving both the first wireless signal and the second wireless signal must be within five feet of the geographic position of the first device and within ten feet of the geographic position of the second device, and the location of the mobile computing device may be determined (or may be narrowed to a small range of possible locations) based on these constraints.

Furthermore, in some examples, determining the location associated with the mobile computing device may include verifying the location determined based on the first and/or second wireless signals using on a GPS location determined based on a GPS signal received by the mobile computing device, or vice versa. For instance, the GPS signal received by the mobile computing device (however weak or inaccurate) may be used to confirm basic details (e.g., an area of the city) of the geographic position that is broadcasted by a device via a short-range wireless signal, e.g., to ensure that there is no error with the broadcast.

At block 410, the determined location may be sent to a dispatcher or other provider of emergency services (e.g., police, ambulance, fire department, etc.), which may include joining the location data to a particular E911 call. In some embodiments, the location may be used to send an appropriate emergency response to the location (e.g., based on both the determined location and any information provided by the caller about the nature of the emergency).

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, unless indicated otherwise, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may likewise be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, in some embodiments, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment or embodiments.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the words "a" or "an" are employed to describe elements and components of the embodiments herein. This is done merely for convenience and to give a general sense of the description. This description, and the claims that follow, should be read to include one or at least one, and the singular also includes the plural unless the context clearly indicates otherwise.

Upon reading this disclosure, those of skill in the art will appreciate still additional alternative structural and functional designs for determining a location of a mobile computing device requesting emergency services. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed is:

1. A computer-implemented method, comprising:
   receiving, by a mobile computing device, an indication of a request for emergency services from a user of the mobile computing device;
   determining, by the mobile computing device, an approximate location associated with the mobile computing device based on a GPS signal received by the mobile computing device;
   based on a characteristic associated with the approximate location being greater than a respective threshold:
      searching, by the mobile computing device, for a first wireless signal including an indication of a first geographic position associated with a first device;

receiving, by the mobile computing device, the first wireless signal from the first device, the first wireless signal including an indication of the first geographic position associated with the first device;

determining, by the mobile computing device, the location associated with the mobile computing device based on the indication of the first geographic position associated with the first device;

verifying, by the mobile computing device, the determined location associated with the mobile computing device based on a GPS location determined based on the GPS signal received by the mobile computing device; and sending, by the mobile computing device, the determined location to a provider of emergency services.

2. The computer-implemented method of claim 1, wherein determining the location associated with the mobile computing device is further based on a first signal strength associated with the first wireless signal.

3. The computer-implemented method of claim 1, wherein the first wireless signal has a first range, and wherein determining the location associated with the mobile computing device is further based on the first range.

4. The computer-implemented method of claim 1, further comprising:

receiving, by the mobile computing device, a second wireless signal from a second device, the second wireless signal including an indication of a second geographic position associated with the second device; and wherein determining the location associated with the mobile computing device is further based on the indication of the second geographic position associated with the second device.

5. The computer-implemented method of claim 4, wherein determining the location associated with the mobile computing device is further based on a first signal strength associated with the first wireless signal and a second signal strength associated with the second wireless signal.

6. The computer-implemented method of claim 1, wherein the first device is attached to or incorporated within a traffic light, a street light, a street sign, a trash bin, a billboard, a building, or a public transit vehicle.

7. The computer-implemented method of claim 1, further comprising:

attempting, by the mobile computing device, to determine the location associated with the mobile computing device based on the GPS signal received by the mobile computing device;

wherein searching for the first wireless signal is further responsive to a failure of the mobile computing device to determine the location associated with the mobile computing device based on the GPS signal received by the mobile computing device within an accuracy threshold.

8. The computer-implemented method of claim 1, further comprising:

identifying, by the mobile computing device, a city associated with the approximate location associated with the mobile computing device determined based on the GPS signal; and wherein the characteristic associated with the approximate location is a characteristic associated with the identified city.

9. A computer-implemented method, comprising:

receiving, from a mobile computing device, an indication of a request for emergency services;

receiving, from the mobile computing device, an indication of a GPS signal received by the mobile computing device;

determining an indication of an approximate location associated with the mobile computing device based on the GPS signal received by the mobile computing device;

based on a characteristic associated with the approximate location being greater than a respective threshold: sending, to the mobile computing device, a request for an indication of a first geographic position associated with a first device;

receiving, from the mobile computing device, the indication of the first geographic position associated with the first device, as received by the mobile computing device via a wireless signal from the first device;

determining a location associated with the mobile computing device based on the indication of the first geographic position associated with the first device;

verifying the determined location associated with the mobile computing device based on a GPS location determined based on the GPS signal received by the mobile computing device; and sending the determined location to a provider of emergency services.

10. The computer-implemented method of claim 9, wherein determining the location associated with the mobile computing device is further based on a first signal strength associated with the first wireless signal.

11. The computer-implemented method of claim 9, wherein the first wireless signal has a first range, and wherein determining the location associated with the mobile computing device is further based on the first range.

12. The computer-implemented method of claim 9, further comprising:

receiving, from the mobile computing device, an indication of a second wireless signal received by the mobile computing device from a second device, the second wireless signal including an indication of a second geographic position associated with the second device; and wherein determining the location associated with the mobile computing device is further based on the indication of the second geographic position associated with the second device.

13. The computer-implemented method of claim 12, wherein determining the location associated with the mobile computing device is further based on a first signal strength associated with the first wireless signal and a second signal strength associated with the second wireless signal.

14. The computer-implemented method of claim 9, wherein the first device is attached to or incorporated within a traffic light, a street light, a street sign, a trash bin, a billboard, a building, or a public transit vehicle.

15. The computer-implemented method of claim 9, further comprising:

receiving, from the mobile computing device, an indication of a GPS signal received by the mobile computing device;

attempting to determine the location associated with the mobile computing device based on the indication of the GPS signal received by the mobile computing device; and responsive to a failure to determine the location associated with the mobile computing device based on the GPS signal received by the mobile computing device within an accuracy threshold, sending, to the mobile computing device, a request for the indication of the first wireless signal including the indication of the first geographic position associated with the first device.

16. The computer-implemented method of claim 9, further comprising:
receiving, from the mobile computing device, an indication of a GPS signal received by the mobile computing device;
determining approximate location associated with the mobile computing device based on the indication of the GPS signal received by the mobile computing device;
identifying a city associated with the approximate location associated with the mobile computing device determined based on the GPS signal; and
based on a characteristic associated with the identified city being greater than a respective threshold, sending, to the mobile computing device, a request for the indication of the first wireless signal including the indication of the first geographic position associated with the first device.

17. A system including:
a device associated with a first geographic position and configured to send a wireless signal including an indication of the first geographic position to mobile computing devices;
one or more processors; and
a non-transitory program memory communicatively coupled to the one or more processors and storing executable instructions that, when executed by the one or more processors, cause the processors to:
receive an indication of a request for emergency services associated with a mobile computing device;
determine an indication of an approximate location associated with the mobile computing device based on a GPS signal received by the mobile computing device;
in response to a characteristic associated with the approximate location being greater than a respective threshold, determine a location associated with the mobile computing device based on the indication of the geographic position associated with the device, as received by the mobile computing device via the wireless signal;
verify the determined location associated with the mobile computing device based on the approximate location determined based on the GPS signal received by the mobile computing device; and
send the determined location to a provider of emergency services.

18. The system of claim 17, wherein the executable instructions that cause the processors to determine the location associated with the mobile computing device further cause the processors to determine the location based on a signal strength associated with the wireless signal.

* * * * *